April 19, 1927.
M. JELBERT, JR
1,625,258
PISTON RING CONTRACTOR
Filed May 5, 1925
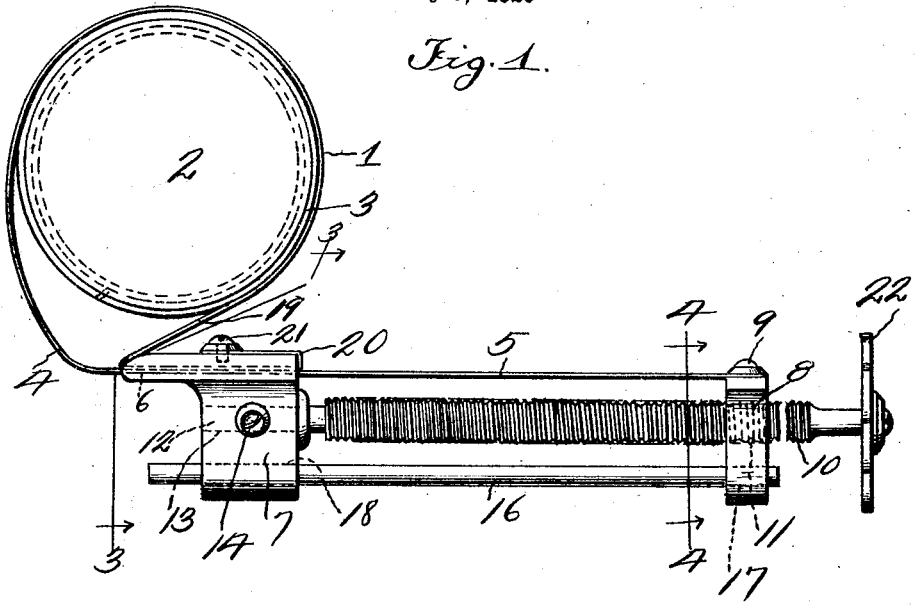
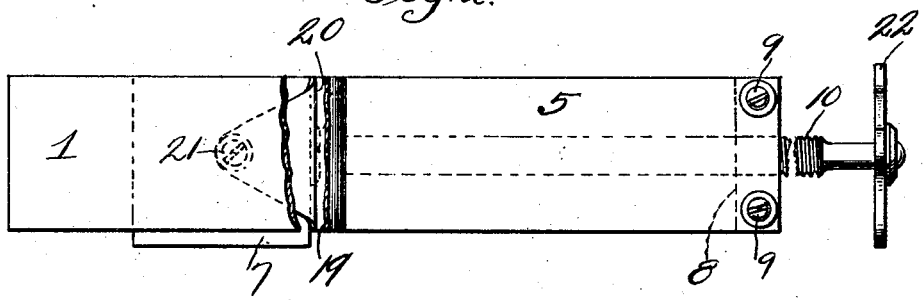
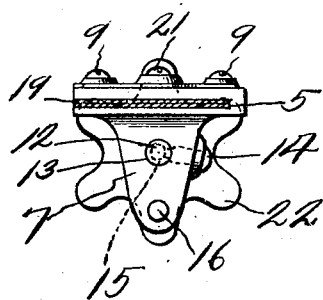
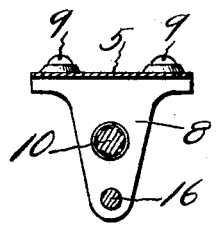
Inventor
M. Jelbert Jr.
By D. Swift
Attorney Patented Apr. 19, 1927.

1,625,258

UNITED STATES PATENT OFFICE.

MARTIN JELBERT, JR., OF LEAD, SOUTH DAKOTA.

PISTON-RING CONTRACTOR.

Application filed May 5, 1925. Serial No. 28,118.

The invention relates to piston ring contractors, and has for its object to provide a device of this character, which may be easily and quickly adjusted to various size pistons for contracting packing rings thereon, and holding the rings contracted until the piston is forced into a cylinder.

A further object is to provide a piston ring contractor comprising spaced blocks, through one of which blocks an operating screw is threaded, said operating screw is pivotally connected to the other block, whereby upon rotation of the operating screw, the blocks will be moved together or forced apart, for contracting or expanding the ring engaging loop.

A further object is to connect one end of the loop to the outer block, and to slidably mount said end in a recess in the other block, and to connect the other end of the loop to the inner block by extending the same inwardly through the block and securing the same to the outer side of the block.

A further object is to provide one of the blocks with a guide rod slidably mounted in an aperture of the other block for guiding the blocks in relation to each other, and maintaining the same in registration during the rotation of the operating screw.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a top plan view of the contractor.

Figure 2 is a side elevation of the contractor, portion of the band being broken away to better show the structure.

Figure 3 is a sectional view taken on line 3—3 of Figure 1.

Figure 4 is a sectional view taken on line 4—4 of Figure 1.

Referring to the drawing, the numeral 1 designates a relatively broad spring loop preferably formed from spring brass or steel, and in which loop is received the piston 2 of an engine, and the contractible rings 3 carried thereby. By having a relatively broad loop 1, substantially all of the piston rings may be held at the same time, thereby obviating several contracting operations in placing a piston in a cylinder. The end 4 of the loop terminates in a straight portion 5, which portion is slidably mounted in the channel 6 of the block 7, and has its end connected to the outer block 8 by means of screws 9, therefore it will be seen that during the contracting and expanding operation of the loop 1, the portion 5 of the loop will assist in accurately guiding the blocks 7 and 8 in relation to each other during the rotation of the operating screw 10. The operating screw 10 is threaded through the block 8 at 11, and is provided with a reduced portion 12 which is rotatably mounted in a bearing 13 of the inner block 7, and is connected thereto by means of a screw 14, the shank of which extends into an annular groove 15 in the reduced portion 12, therefore it will be seen that when the operating screw 10 is rotated, the blocks 7 and 8 will be moved together. To further hold the blocks in registration during their movement, a guide rod 16 is provided, which guide rod is tightly fitted in the aperture 17 of the block 8 and is slidably mounted in a bearing 18 of the block 7, therefore it will be seen that the rod 16 and the end 5 of the loop will combine to form means for rigidly maintaining blocks 7 and 8 in registration.

The end 19 of the loop extends through the channel 6 of the block 7 in engagement with the outer side of the portion 5 of the loop, and is bent at 20 onto the outer side of the block 7, and is rigidly connected at 21 to the block, therefore it will be seen that when the operating screw 10 is rotated by the operator grasping the hand wheel 22, the loop 1 will be contracted or expanded according to the direction of rotation of the operating screw. It will also be seen that the device has a wide range of adjustability whereby it will accommodate itself for use in connection with pistons of various diameters, therefore the same contractor may be used in connection with different size pistons.

From the above it will be seen that a piston ring contracting device is provided, which is simple in construction, provided with a relatively wide band forming the loop for receiving a plurality of rings and by forming the loop from spring material that said loop will expand in size under the spring action of the material, and will maintain substantially a round form for receiving therein a piston and rings carried by the pistons.

The invention having been set forth what is claimed as new and useful is:—

1. A ring contractor comprising spaced blocks, an operating screw threaded through one of the blocks and rotatably mounted in the other block, a guide rod carried by one of the blocks and slidably mounted in the other block, an expansible loop, one end of said loop terminating in a flat portion, said flat portion having its end anchored to one of the blocks and slidably mounted in a channel of the other block, the other end of said loop extending through the channel of said last named block and anchored to the outer side of the block.

2. A ring contracting device comprising an expansible loop formed from spring material, inner and outer spaced blocks, one end of the loop extending through a channel in the inner block and anchored to the outer block, the other end of said loop extending through said channel and anchored to the outer block, an operating screw threaded through the outer block and rotatably mounted in the inner block, a guide rod carried by the outer block, said guide rod being slidably mounted in a bearing of the inner block.

3. The combination with a ring contractor comprising a flexible loop, spaced blocks, an operating screw rotatably mounted in one of the blocks and threaded through the other block, one end of said loop being anchored to one of the blocks, of means for maintaining said blocks in registration during the rotation of the screw, said means comprising one end of said loop, said loop end extending through a slot in one of the blocks and anchored to the other block, and a guide rod carried by one of the blocks and slidably mounted in the other block.

In testimony whereof I affix my signature.

MARTIN JELBERT, Jr.